No. 733,443. PATENTED JULY 14, 1903.
W. WALTER & W. KÜNSTNER.
BUTTON OR FASTENER.
APPLICATION FILED DEC. 1, 1902.
NO MODEL.
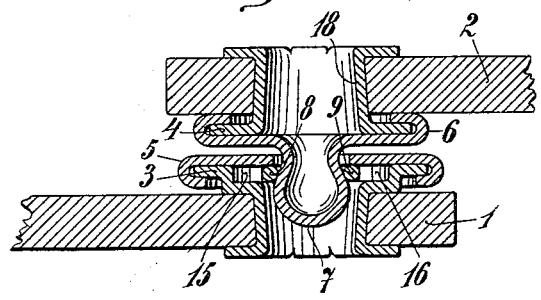
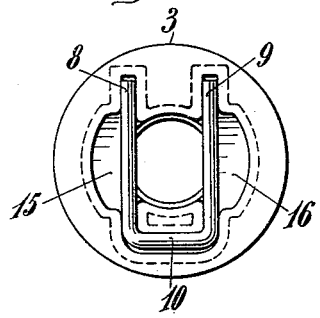
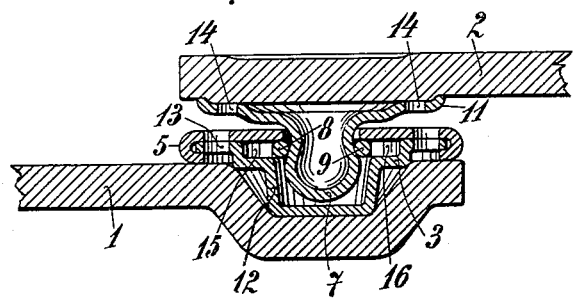
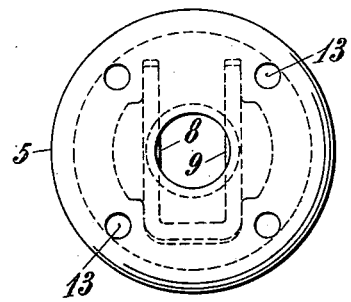
Witnesses.
Hiroshi Mori.
L. Waldman
Inventors,
Wilhelm Walter
Wilhelm Künstner
by B. Singer
Att'y.

No. 733,443. Patented July 14, 1903.

UNITED STATES PATENT OFFICE.

WILHELM WALTER AND WILHELM KÜNSTNER, OF PRAGUE, AUSTRIA-HUNGARY.

BUTTON OR FASTENER.

SPECIFICATION forming part of Letters Patent No. 733,443, dated July 14, 1903.

Application filed December 1, 1902. Serial No. 133,498. (No model.)

*To all whom it may concern:*

Be it known that we, WILHELM WALTER and WILHELM KÜNSTNER, both subjects of the Emperor of Austria-Hungary, residing at Prague, in the Kingdom of Bohemia, Austria-Hungary, have invented certain new and useful Improvements in Buttons or Fasteners, of which the following is a specification.

This invention relates more particularly to metallic buttons or fasteners in which a stud or head engages with a resilient socket member; and its object is to provide such a device that will be cheap and simple in construction and durable in operation.

In the drawings, Figure 1 is a sectional view of a device embodying this invention. Fig. 2 is a plan view of a portion of the socket member with the top cap removed. Fig. 3 is a sectional view of a modified form of construction. Fig. 4 is a plan view of the socket member of the same.

1 and 2 represent the layers of fabric to be united by the buttons. A flanged socket member 3 is secured in the layer 1. In the top flange of the socket 3 are formed bearings for a substantially U-shaped spring 10, having parallel arms 8 and 9. These arms lie tangentially along the sides of the opening through the socket, the distance between them being slightly less than the diameter of the stud-head 7, which is to be engaged by them. As these arms have bearings at either end, depressions 15 and 16 are formed in the top flange to allow them to spring away from the central aperture. A cap or cover 5 is fastened securely on the top flange to hold the spring in place. The stud comprises a tubular member 18, which is secured in the layer 2 of the fabric and is flanged to engage the base 6 of the head 7.

It is often desirable to sew the stud and socket members to the fabric, which may be done as shown in Fig. 3. The base 11 of the head 7 is provided with holes 14 and the flange of the socket 12 with holes 13 to receive the thread.

It is evident that the springs could be separate instead of U-shaped; but the latter is preferred on account of being more easily assembled.

We claim—

1. In a metallic-button resilient socket member, the combination of a tubular flanged socket, bearings pressed in one of the flanges to receive springs, parallel springs engaging said bearings disposed tangentially to the central opening, lateral recesses at the centers of said springs to allow them to be flexed and a cover-plate engaging said flange to hold the springs in position.

2. In combination, in a button, a stud member provided with a head, a tubular socket member, a flange on said socket member, bearings pressed in said flange for a U-shaped spring, the parallel arms of the spring adapted to engage the stud-head, recesses in said flange to provide for the movement of the spring-arms at the center of the socket, and a cover-plate to hold said spring in position.

In testimony whereof we affix our signatures in presence of two witnesses.

WILH. WALTER.
WILH. KÜNSTNER.

Witnesses:
ADOLPH FISCHER,
LISER GÜRTLER.